(12) United States Patent
Arat et al.

(10) Patent No.: US 11,702,084 B2
(45) Date of Patent: Jul. 18, 2023

(54) VEHICLE SIDESLIP ANGLE ESTIMATION SYSTEM AND METHOD

(71) Applicant: The Goodyear Tire & Rubber Company, Akron, OH (US)

(72) Inventors: Mustafa Ali Arat, Ettelbruck (LU); Kanwar Bharat Singh, Lorenztweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 16/693,486

(22) Filed: Nov. 25, 2019

(65) Prior Publication Data
US 2021/0155251 A1 May 27, 2021

(51) Int. Cl.
*B60W 40/103* (2012.01)
*B60W 40/064* (2012.01)
(Continued)

(52) U.S. Cl.
CPC ........ *B60W 40/103* (2013.01); *B60W 40/064* (2013.01); *B60W 40/068* (2013.01);
(Continued)

(58) Field of Classification Search
CPC ............. B60W 40/064; B60W 40/068; B60W 40/072; B60W 40/076; B60W 40/101;
(Continued)

(56) References Cited

U.S. PATENT DOCUMENTS 6,374,172 B1 * 4/2002 Yamaguchi ......... B60W 40/103
701/90
6,547,343 B1 4/2003 Hac
(Continued)

FOREIGN PATENT DOCUMENTS

GB 2263180 A 7/1993

OTHER PUBLICATIONS

EPO search report issued by the EPO dated Apr. 16, 2021.

*Primary Examiner* — Russell Frejd
*Assistant Examiner* — Brandon Z Willis
(74) *Attorney, Agent, or Firm* — Edward T. Kennedy

(57) ABSTRACT

A vehicle sideslip estimation system includes sensors mounted on a vehicle and a kinematic model receiving signals from the sensors to estimate a lateral velocity of the vehicle. A compensated acceleration calculator calculates a compensated lateral acceleration as a measure of conditions that result in a deviation of a measured lateral acceleration. A lateral acceleration calculator determines, based on the compensated lateral acceleration and the measured lateral acceleration, if a lateral acceleration error is larger than a predefined threshold. A filter corrects the estimated lateral velocity of the vehicle when the lateral acceleration error is larger than the predefined threshold. A velocity output register registers the estimated lateral velocity of the vehicle when the lateral acceleration error is smaller than the predefined threshold, and a sideslip calculator calculates a sideslip angle of the vehicle in real time from the registered lateral velocity of the vehicle and a vehicle longitudinal velocity.

20 Claims, 9 Drawing Sheets

(51) Int. Cl.
*B60W 40/068* (2012.01)
*B60W 40/109* (2012.01)
*B60W 40/12* (2012.01)
*B60K 28/16* (2006.01)

(52) U.S. Cl.
CPC .......... *B60W 40/109* (2013.01); *B60W 40/12* (2013.01); *B60K 28/16* (2013.01); *B60W 2520/20* (2013.01)

(58) Field of Classification Search
CPC ............. B60W 40/103; B60W 40/109; B60W 40/107; B60W 40/114; B60W 40/12; B60W 2510/207; B60W 2520/20; B60W 2520/14; B60W 2520/105; B60W 2520/10; B60W 2520/125; B60W 2520/12; B60W 2720/12; B60W 2720/20; B60W 2720/125; B60W 2552/20; B60W 2552/30; B60W 2552/40; B60W 2552/05; B60K 28/16; B60K 28/10
See application file for complete search history.

(56) References Cited

U.S. PATENT DOCUMENTS

| | | | | |
|---|---|---|---|---|
| 7,844,383 | B2 * | 11/2010 | Shinozawa | B60T 8/172 |
| | | | | 701/72 |
| 7,885,750 | B2 * | 2/2011 | Lu | B60W 40/072 |
| | | | | 701/90 |
| 8,280,586 | B2 * | 10/2012 | Jung | B60T 8/172 |
| | | | | 701/41 |
| 8,321,088 | B2 * | 11/2012 | Brown | B60W 50/035 |
| | | | | 701/38 |
| 9,428,013 | B2 | 8/2016 | Singh et al. | |
| 9,751,533 | B2 | 9/2017 | Singh | |
| 9,873,293 | B2 | 1/2018 | Singh et al. | |
| 9,878,738 | B2 * | 1/2018 | Klier | B62D 6/005 |
| 9,995,654 | B2 | 6/2018 | Singh | |
| 10,597,039 | B2 * | 3/2020 | Milanese | B60W 40/10 |
| 2004/0098184 | A1 * | 5/2004 | Ghoneim | B60T 8/17555 |
| | | | | 701/1 |
| 2014/0163816 | A1 | 6/2014 | Singh et al. | |
| 2014/0277926 | A1 | 9/2014 | Singh et al. | |
| 2016/0159367 | A1 | 6/2016 | Singh et al. | |
| 2017/0247038 | A1 * | 8/2017 | Savaresi | B60T 8/17552 |

* cited by examiner

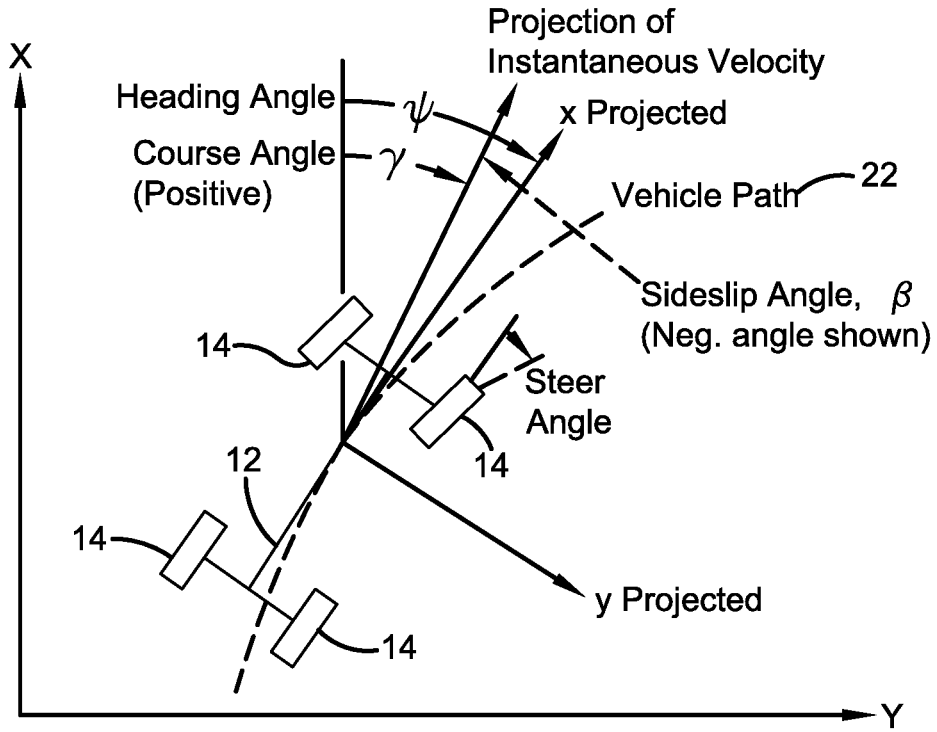
FIGURE 3
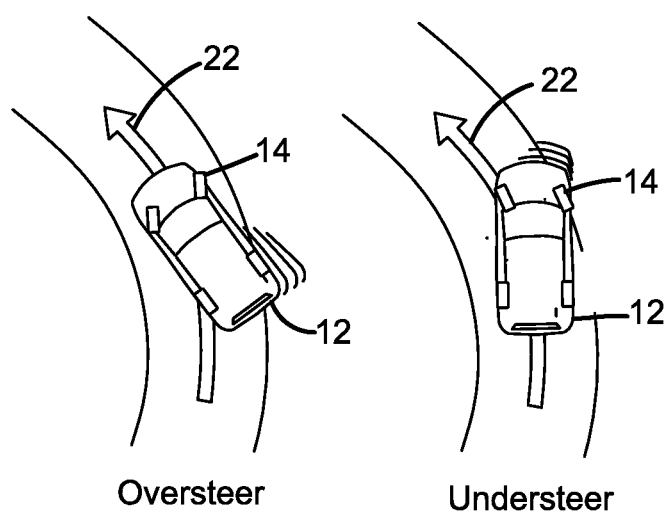
FIGURE 4A  FIGURE 4B

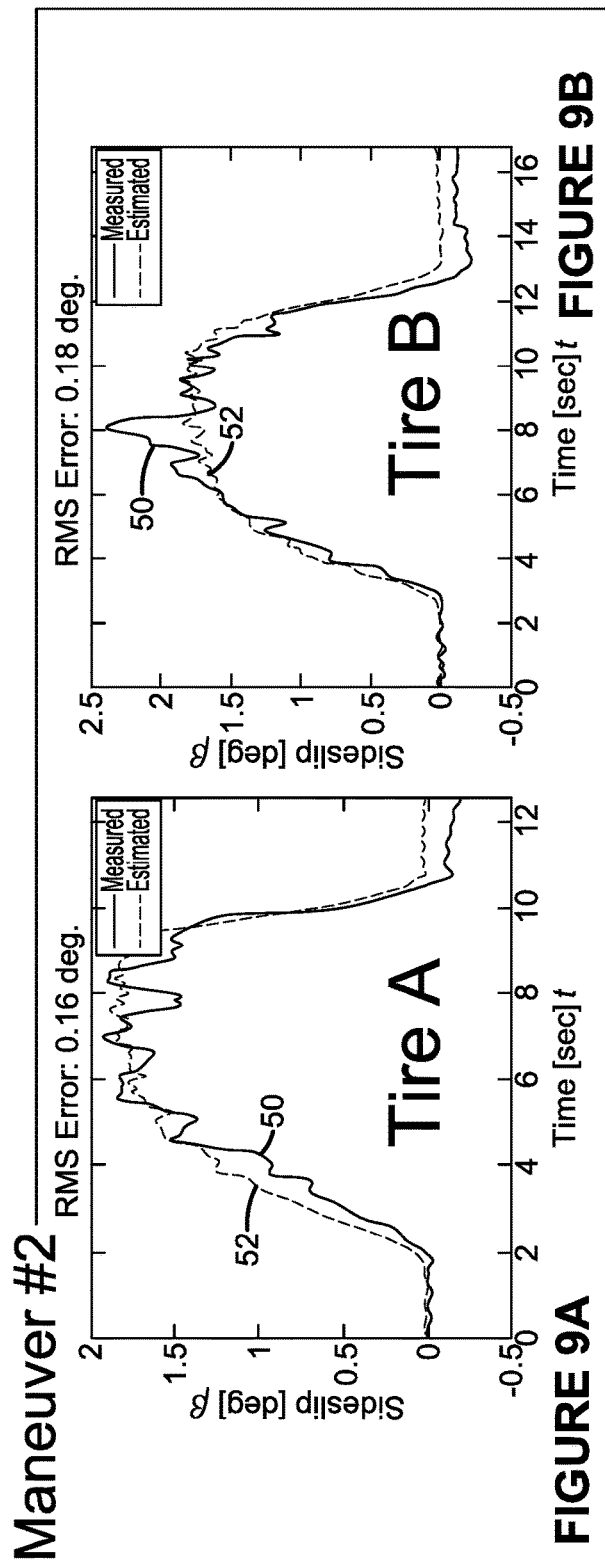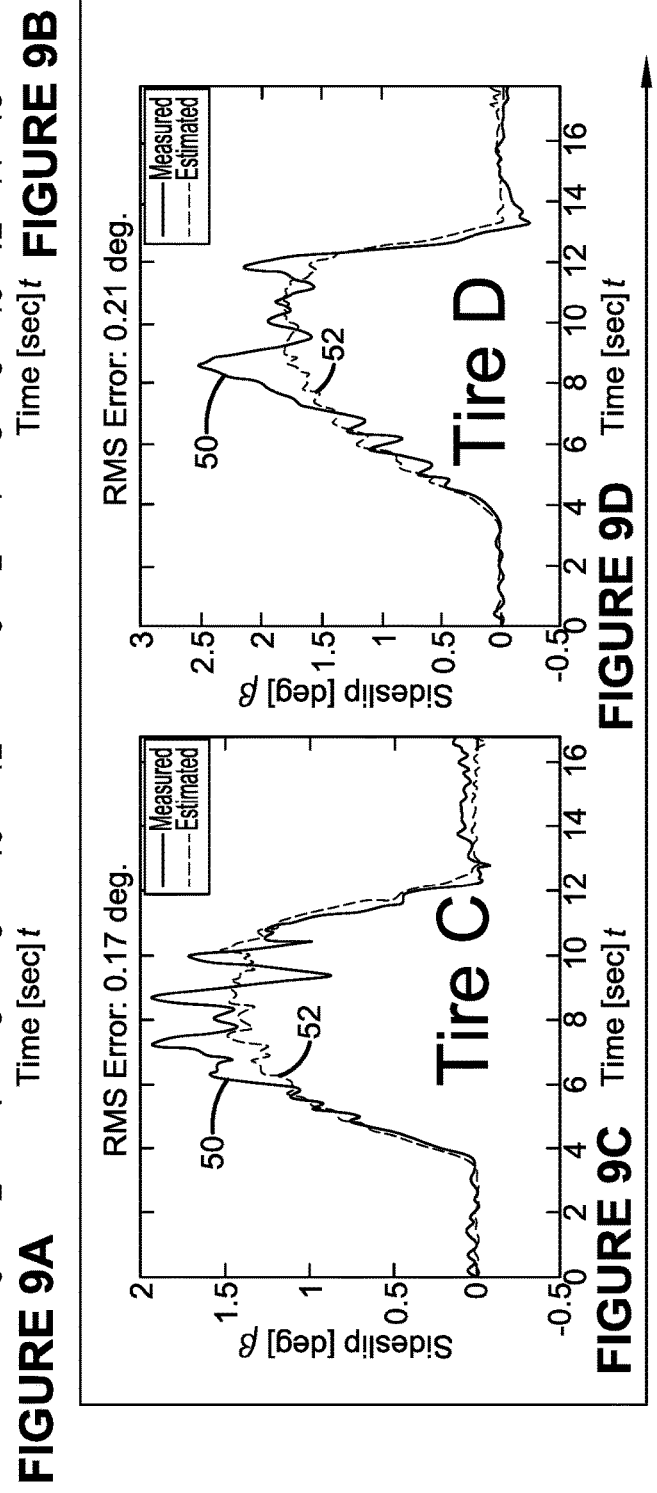

VEHICLE SIDESLIP ANGLE ESTIMATION SYSTEM AND METHOD

FIELD OF THE INVENTION

The invention relates generally to vehicle and tire monitoring systems. More particularly, the invention relates to systems that measure and collect vehicle and tire parameter data. The invention is directed to a system and method for accurately and reliably estimating in real time a sideslip angle of a vehicle using measured parameters.

BACKGROUND OF THE INVENTION

The state conditions of a vehicle vary based upon different driving conditions, such as the number of passengers in the vehicle, seating arrangement, driving terrain, and road conditions. Variation in such state conditions may affect the accuracy of vehicle state estimator models that are employed in vehicle control systems, including braking, traction, stability, and suspension systems, as well as tire state estimator models, which may also be used in the control systems and to predict tire wear. Real time knowledge of the vehicle state conditions thus is useful in many vehicle control systems as well as tire wear estimation.

Among the vehicle state conditions is the sideslip angle of the vehicle. The sideslip angle is the difference between the projected heading of the vehicle and its actual heading. Real-time knowledge of the sideslip angle of a vehicle is useful in many active vehicle safety applications. However, measurement of sideslip angle requires a complex and expensive sensor system that is generally cost prohibitive for many applications.

Strategies haven been employed to estimate sideslip angle based on specific models or observers which employ vehicle and/or tire parameters. However, these strategies have not been able to account for certain types of road conditions, such as banks or grades, and nonlinearities in vehicle motion, such as roll and pitch. The inability of prior art strategies to account for such road conditions and nonlinearities in vehicle motion undesirably reduces the accuracy of the resulting estimations. In addition, prior art techniques have been dependent upon the particular set of tires that the vehicle is equipped with which leads to inaccuracies when different tires are employed on the vehicle.

As a result, there is a need in the art for a system and method that accurately and reliably estimates vehicle sideslip angle and which accounts for road conditions and nonlinearities in vehicle motion.

SUMMARY OF THE INVENTION

According to an aspect of an exemplary embodiment of the invention, a vehicle sideslip estimation system includes a vehicle that in turn includes a controlled area network (CAN) bus system. Sensors are mounted on the vehicle in communication with the CAN bus system, and a kinematic model is in communication with the CAN bus system. The kinematic model receives signals from the sensors as inputs and estimates a lateral velocity of the vehicle based on the inputs. The inputs include a measured vehicle lateral acceleration and a vehicle longitudinal velocity. A compensated acceleration calculator is in communication with the CAN bus system to calculate a compensated vehicle lateral acceleration as a measure of conditions that result in a deviation of the measured vehicle lateral acceleration. A lateral acceleration calculator in communication with the CAN bus system to determine, based on the compensated vehicle lateral acceleration and the measured vehicle lateral acceleration, if a lateral acceleration error is larger than a predefined threshold. A filter is in communication with the CAN bus system to correct the estimated lateral velocity of the vehicle when the lateral acceleration error is larger than the predefined threshold. A velocity output register in communication with the CAN bus system to register the estimated lateral velocity of the vehicle when the lateral acceleration error is smaller than or equal to the predefined threshold. A sideslip calculator is in communication with the CAN bus system to calculate a sideslip angle of the vehicle in real time from the registered lateral velocity of the vehicle and the vehicle longitudinal velocity.

According to an aspect of another exemplary embodiment of the invention, a method for estimating a vehicle sideslip angle includes the steps of providing a vehicle that includes a controlled area network (CAN) bus system and sensors mounted on the vehicle that are in communication with the CAN bus system. Signals from the sensors, including a measured vehicle lateral acceleration and a vehicle longitudinal velocity, are input into a kinematic model which is in communication with the CAN bus system. A lateral velocity of the vehicle is estimated with the kinematic model based on the inputs. A compensated vehicle lateral acceleration, as a measure of conditions that result in a deviation of the measured vehicle lateral acceleration, is calculated with a compensated acceleration calculator that is in communication with the CAN bus system. It is determined if a lateral acceleration error is larger than a predefined threshold, based on the compensated vehicle lateral acceleration and the measured vehicle lateral acceleration with a lateral acceleration calculator in communication with the CAN bus system. When the lateral acceleration error is larger than the predefined threshold, the estimated lateral velocity of the vehicle is corrected with a filter in communication with the CAN bus system. When the lateral acceleration error is smaller than or equal to the predefined threshold, the estimated lateral velocity of the vehicle is registered with a velocity output register in communication with the CAN bus system. A sideslip angle of the vehicle is calculated in real time from the registered lateral velocity of the vehicle and the vehicle longitudinal velocity with a sideslip calculator in communication with the CAN bus system.

BRIEF DESCRIPTION OF THE DRAWINGS

The invention will be described by way of example and with reference to the accompanying drawings, in which:

FIG. 3 is a schematic representation of the lateral velocity and sideslip angle of a vehicle;

FIG. 4A is a first schematic representation of motion stability of a vehicle defined by the sideslip angle;

FIG. 4B is a second schematic representation of motion stability of a vehicle defined by the sideslip angle;

FIG. 9A is a first graph showing performance of the vehicle sideslip estimation system and method of the present invention;

FIG. 9B is a second graph showing performance of the vehicle sideslip estimation system and method of the present invention;

FIG. 9C is a third graph showing performance of the vehicle sideslip estimation system and method of the present invention;

FIG. 9D is a fourth graph showing performance of the vehicle sideslip estimation system and method of the present invention;

Similar numerals refer to similar parts throughout the drawings.

DEFINITIONS

Figure 1:
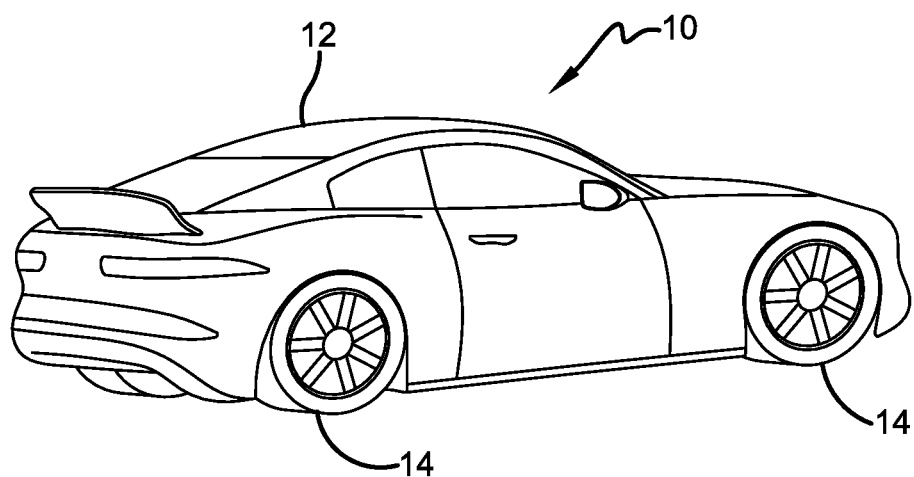
FIG. 1 is a perspective view of an exemplary vehicle employing the vehicle sideslip estimation system and method of the present invention.

"ANN" or "artificial neural network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Axial" and "axially" means lines or directions that are parallel to the axis of rotation of the tire.

"CAN bus" or "CAN bus system" is an abbreviation for controller area network system, which is a vehicle bus standard designed to allow microcontrollers and devices to communicate with each other within a vehicle without a host computer. CAN bus is a message-based protocol, designed specifically for automotive applications.

"Circumferential" means lines or directions extending along the perimeter of the surface of the annular tread of the tire perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface, such as the ground, as the tire rotates or rolls.

"Inboard side" means the side of the tire nearest the vehicle when the tire is mounted on a wheel and the wheel is mounted on the vehicle.

"Kalman filter" is a set of mathematical equations that implement a predictor-corrector type estimator that is optimal in the sense that it minimizes the estimated error covariance—when some presumed conditions are met.

"Lateral" means an axial direction.

"Lateral edges" means a line tangent to the axially outermost tread contact patch or footprint of the tire as measured under normal load and tire inflation, the lines being parallel to the equatorial centerplane.

"Luenberger observer" is a state observer or estimation model. A "state observer" is a system that provide an estimate of the internal state of a given real system, from measurements of the input and output of the real system. It is typically computer-implemented, and provides the basis of many practical applications.

"Net contact area" means the total area of ground contacting tread elements between the lateral edges around the entire circumference of the tread of the tire divided by the gross area of the entire tread between the lateral edges.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Slip angle" is the angle between a vehicle's direction of travel and the direction in which the front wheels are pointing. Slip angle is a measurement of the deviation between the plane of tire rotation and the direction of travel of a tire.

"Tread element" or "traction element" means a rib or a block element of the tire defined by a shape having adjacent grooves.

"Tread arc width" means the arc length of the tread of the tire as measured between the lateral edges of the tread.

DETAILED DESCRIPTION OF THE INVENTION

Figure 2:
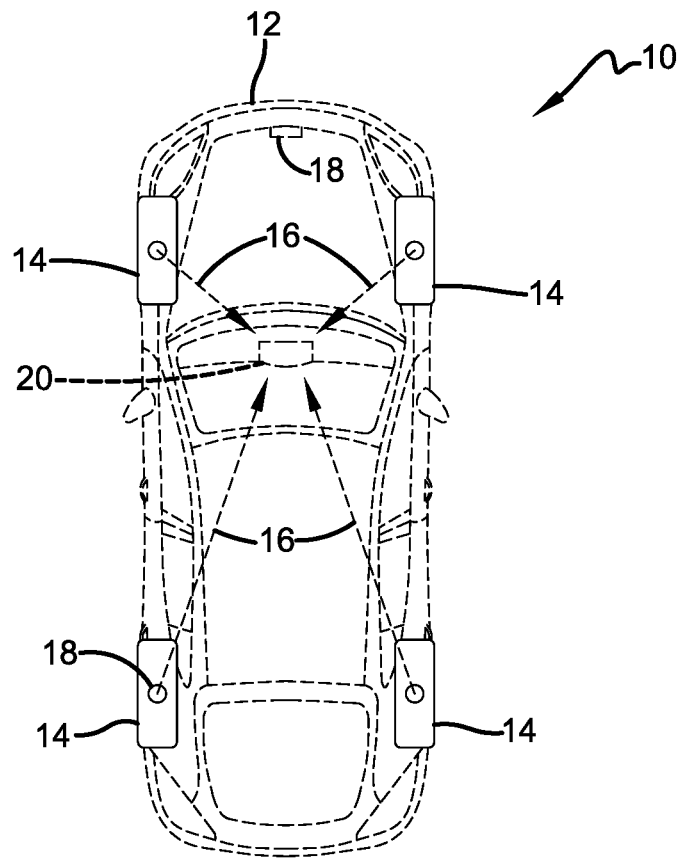
FIG. 2 is a plan view of the vehicle shown in FIG. 1, with certain portions of the vehicle represented by dashed lines.

A first exemplary embodiment of the vehicle sideslip estimation system of the present invention is indicated at 10 in FIGS. 1 through 10. With particular reference to FIGS. 1 and 2, a vehicle 12 is supported by tires 14. While the vehicle 12 is depicted as a passenger car, the invention is not to be so restricted. The principles of the invention find application in other vehicle categories such as commercial trucks in which vehicles may be supported by more or fewer tires than shown in FIGS. 1 and 2.

The vehicle 12 includes a CAN bus system 16, which is a central system that enables electronic communication with sensors 18 mounted on the vehicle and/or the tires 14, and may be a wired or a wireless system. Aspects of the vehicle sideslip estimation system 10 preferably are executed on a processor 20 that is accessible through the vehicle CAN bus 16. The CAN bus 16 enables the processor 20, and accompanying memory, to receive input of data from the sensors 18 and to interface with other electronic components, as will be described in greater detail below.

Figure 5:
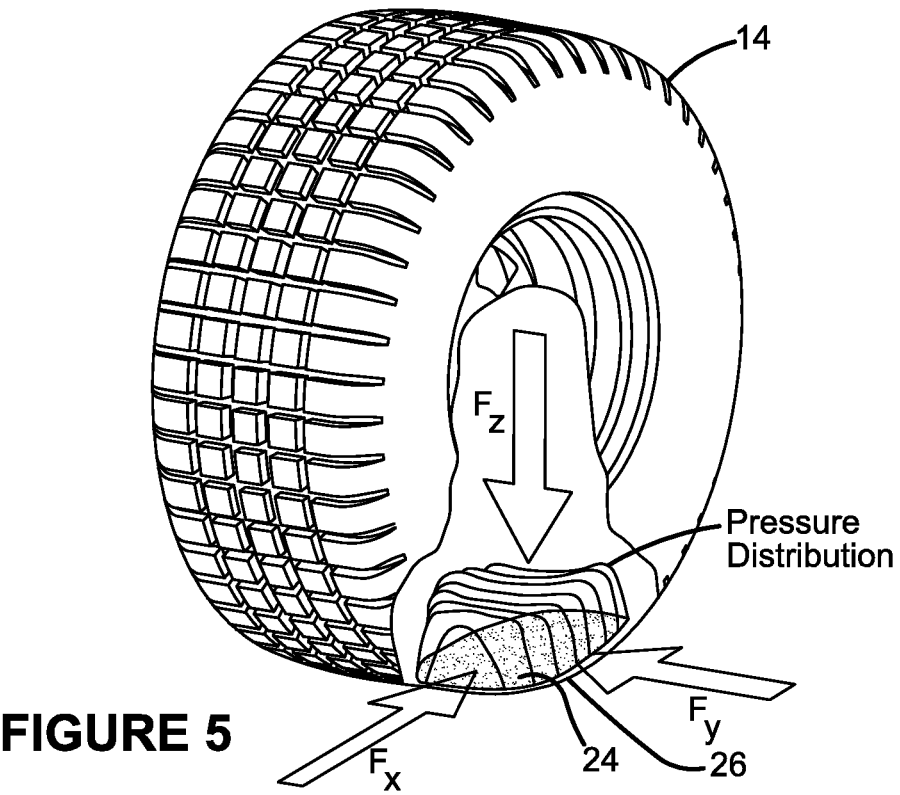
FIG. 5 is an expanded perspective view of a tire, partially in section, showing a contact patch of a tire.

Turning to FIGS. 3 and 5, as the vehicle 12 travels along a path 22, it experiences a lateral velocity $v_y$, which is a velocity of the vehicle that is orthogonal to its motion in its heading direction x. The lateral velocity $v_y$ generates lateral forces $F_y$ at a contact patch 24 between the tire 14 and the road 26. The lateral forces $F_y$ are the total lateral force acting on the vehicle 12, and are direct functions of a sideslip angle $\beta$ of the vehicle 12. The sideslip angle $\beta$ of the vehicle 12 may be defined as the difference between projected heading and instantaneous or actual heading of the vehicle. The sideslip angle $\beta$ may also be formulated by the ratio of the lateral velocity $v_y$ and the longitudinal velocity $v_x$ of the vehicle 12.

The sideslip angle $\beta$ is a primary state of the vehicle 12 that defines motion stability. For example, as shown in FIGS. 4A and 4B, the sideslip angle defines oversteer (FIG. 4A) and understeer (FIG. 4B) conditions of the vehicle 12. The sideslip angle β is a dominating variable in vehicle dynamics analysis, and is employed in characterizing the handling performance of the vehicle 12, as well as in analyzing the response of the tire 14 in lateral motion.

However, measuring the sideslip angle β is tedious. Accurate measurements of the sideslip angle β require costly equipment, which is not feasible for production vehicles, and may also not be feasible in many cases for testing purposes. In the prior art, methods have been proposed to estimate the sideslip angle β using measurements from conventional sensors 18 on the vehicle 12, such as inertial measurement units (IMUs). Such methods include estimation of the sideslip angle β and the lateral velocity $v_y$ of the vehicle 12 using physical or model-based approaches and statistical-based approaches. The prior art model-based approaches are based on kinematic relations, which rely on accurately measured parameters. However, such models experience inaccuracies due to the omission of parameter variations, lack of tire dependent inputs and nonlinearities. The prior art statistical-based approaches, which include machine learning, employ training or tuning, which must be performed very carefully over an extensive set of use cases. Such extensive training or tuning renders such statistical-based approaches impractical.

Figure 6:
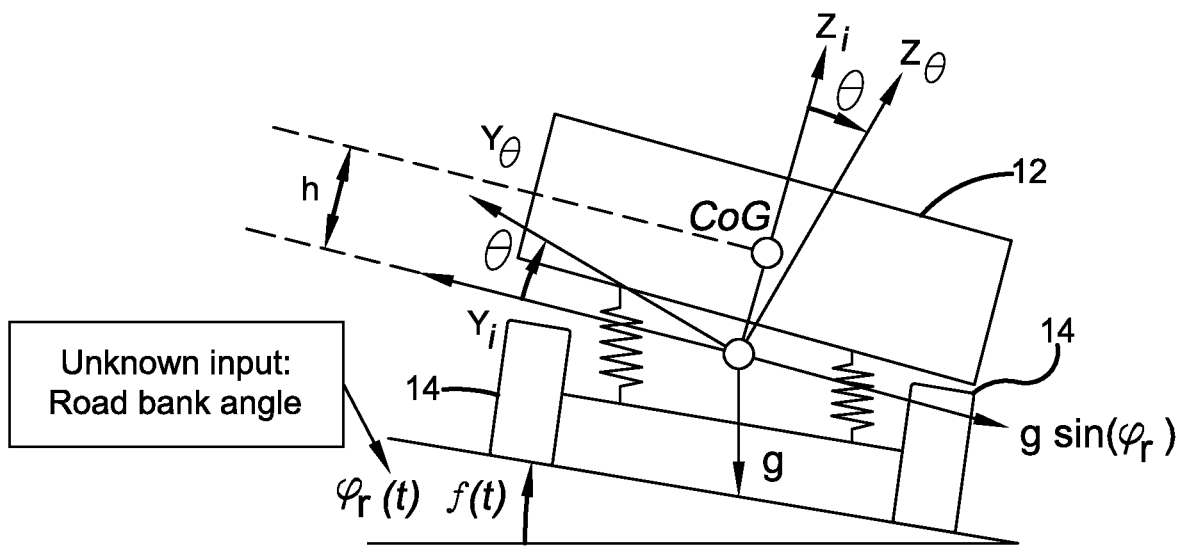
FIG. 6 is a schematic representation of the effect of road conditions on the vehicle sideslip angle.

Essential challenges in estimating the lateral velocity $v_y$ and the resulting sideslip angle β of the vehicle 12 lie in matching the exogenous or external inputs from the road 26 and nonlinearities in vehicle motion. Turning to FIG. 6, road inputs, such as road bank or grade, are not feasible to be generalized and modeled. In addition, nonlinearities in the motion of the vehicle 12, such as roll and pitch, render mathematical models inapplicable in estimating vehicle states, including sideslip angle β.

The vehicle sideslip estimation system 10 of the present invention provides a system and accompanying method to estimate the lateral velocity $v_y$ and the sideslip angle β of the vehicle 12 in real time, employing conventional sensors 18 that are available on the vehicle. The vehicle sideslip estimation system 10 captures the effects of unknown inputs from the road 26, as well as nonlinearities in vehicle response, based on a change in lateral acceleration $a_y$ through operation of the vehicle 12. The vehicle sideslip estimation system 10 calculates such exogenous inputs and nonlinearities, and filters them for correction of the vehicle state.

Figure 7:
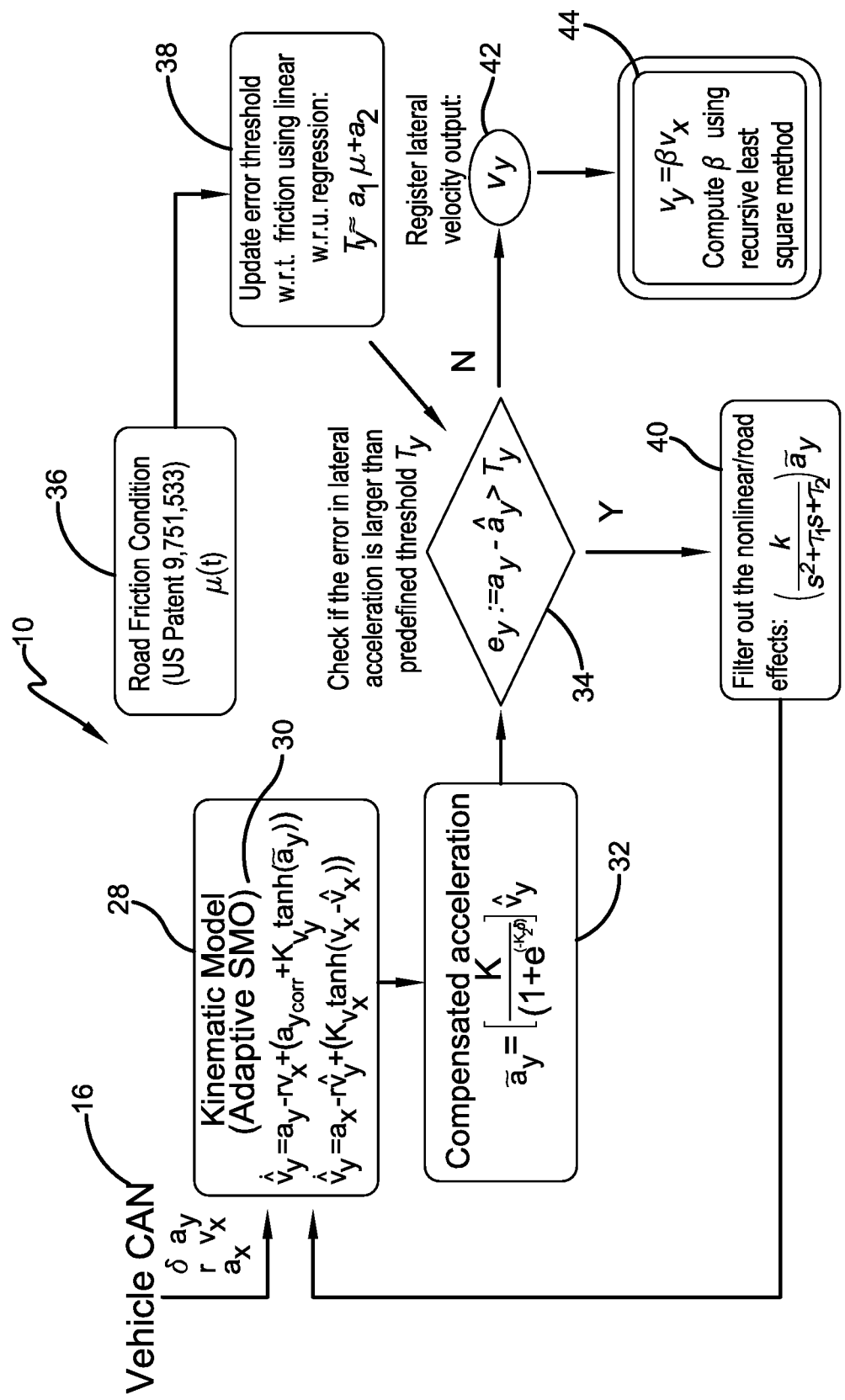
FIG. 7 is a flow diagram showing the vehicle sideslip estimation system of the present invention and the steps of the associated method.
Figures 8A, 8B:
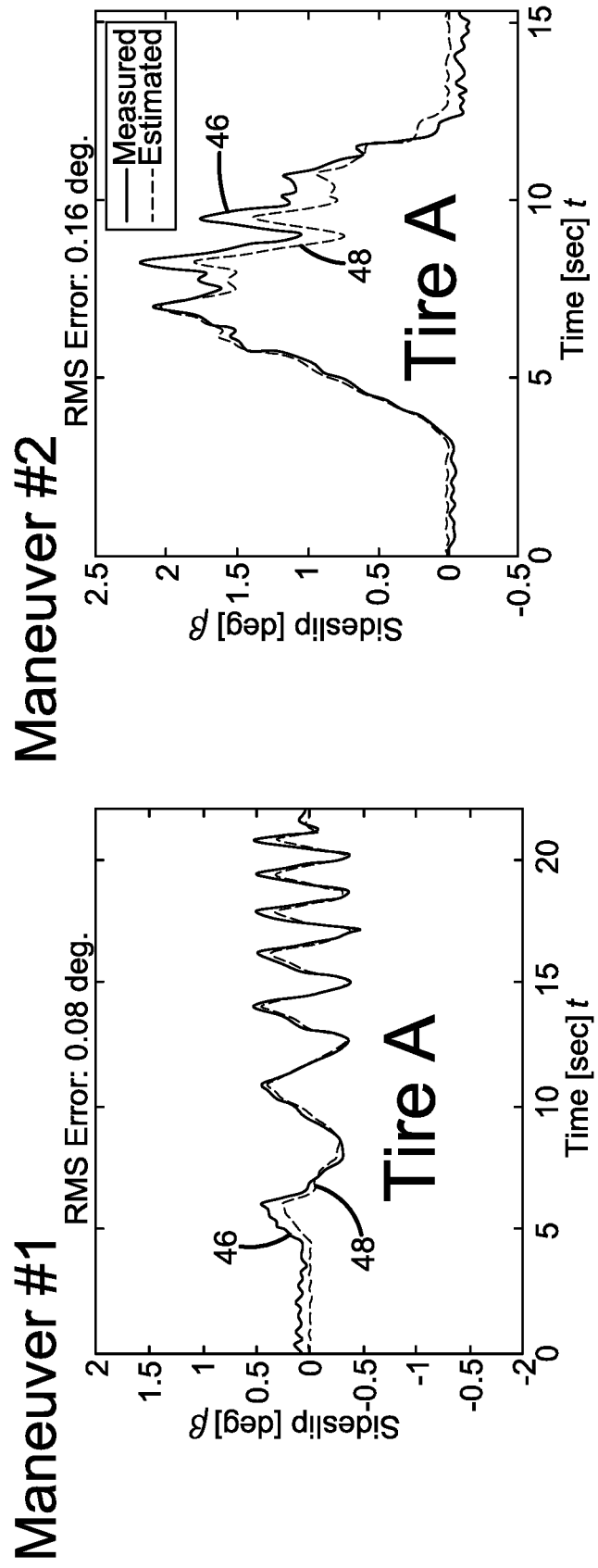
FIG. 8A is a first graph showing performance of a prior art model-based vehicle sideslip estimation system.
FIG. 8B is a second graph showing performance of a prior art model-based vehicle sideslip estimation system.
Figure 8C:
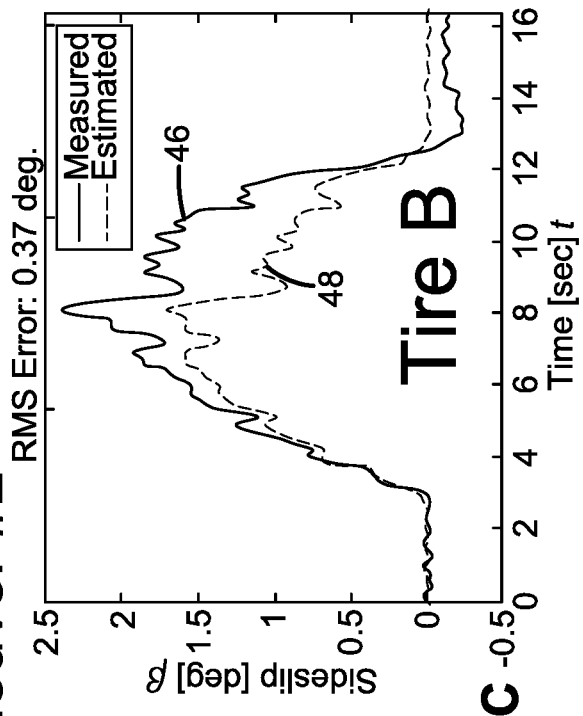
FIG. 8C is a third graph showing performance of a prior art model-based vehicle sideslip estimation system.
Figure 8D:
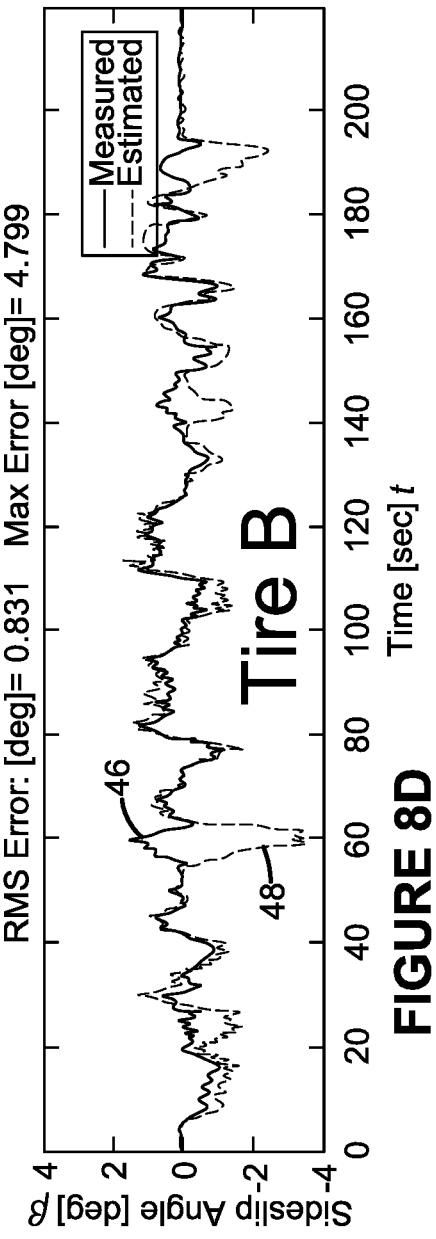
FIG. 8D is a fourth graph showing performance of a prior art model-based vehicle sideslip estimation system.
Figure 9E:
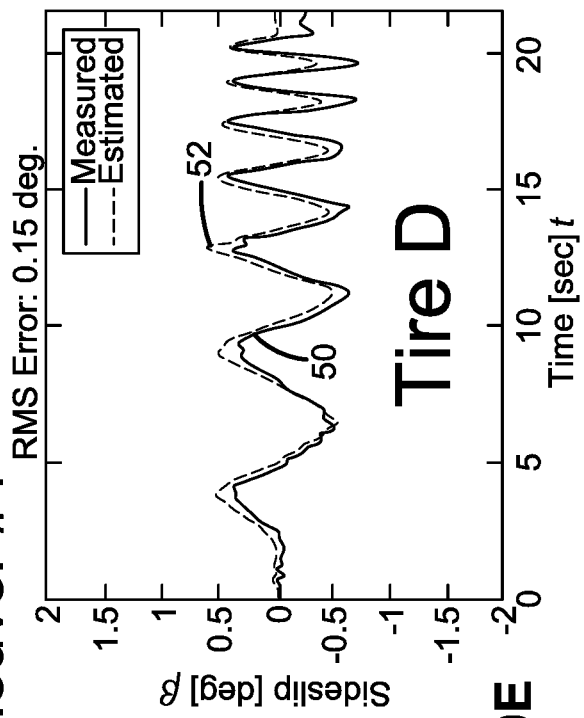
FIG. 9E is a fifth graph showing performance of the vehicle sideslip estimation system and method of the present invention.
Figure 9F:
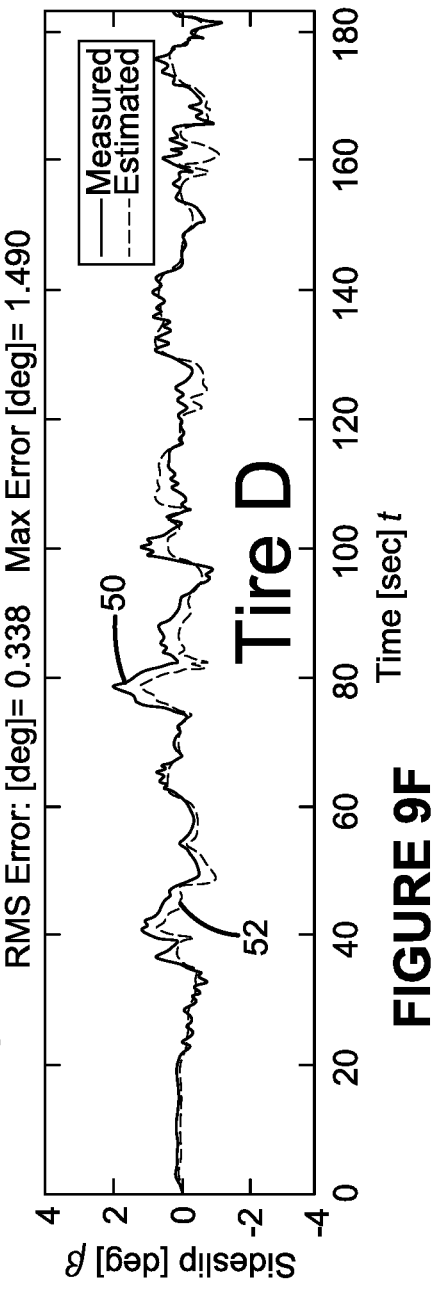
FIG. 9F is a sixth graph showing performance of the vehicle sideslip estimation system and method of the present invention.

With reference to FIG. 7, a flow diagram shows the system of the vehicle sideslip estimation system 10 and illustrates the steps of the accompanying method. Nomenclature is as follows:
δ: steering wheel angle
r: yaw rate
$a_x$: longitudinal acceleration
$a_y$: lateral acceleration
$v_x$: longitudinal velocity
$v_y$: lateral velocity
β: sideslip angle
$K_{v_x}$: longitudinal velocity gain value
$K_{v_y}$: lateral velocity gain value Signals from sensors 18 that are attached to the vehicle 12 are available from the CAN bus 16 and provide measured values for the steering wheel angle δ, the yaw rate r, the vehicle longitudinal acceleration $a_x$, the vehicle lateral acceleration $a_y$, and the vehicle longitudinal velocity $v_x$ as inputs into a kinematic model 28. Preferably, the sensors 18 are conventional sensors that are available on production vehicles 12, such as body accelerometers, rate gyros, speed sensors and steering wheel angle sensors.

The kinematic model 28 is in communication with the CAN bus 16 and preferably employs an adaptive sliding mode observer (SMO) 30 to estimate the lateral velocity $v_y$ of the vehicle 12. For example:

$$\hat{v}_y = f(a_y, r, \hat{v}_x, K_{v_y})$$

Where the lateral velocity $v_y$ is a function of the vehicle lateral acceleration $a_y$, the yaw rate r, the vehicle longitudinal velocity $v_x$, and the lateral velocity gain value $K_{v_y}$ in the observer 30.

While the longitudinal velocity $v_x$ is obtained from the vehicle CAN bus 16 as a measured signal, it is updated for observability of the system 10 and to act as a filter on the CAN bus signal:

$$\hat{v}_x = f(a_x, r, \hat{v}_y, K_{v_x})$$

The update of the longitudinal velocity $v_x$ is a function of the vehicle longitudinal acceleration $a_x$, the yaw rate r, the last estimated lateral velocity $v_y$, and the longitudinal velocity gain value $K_{v_x}$. The gain values $K_{v_x}$ and $K_{v_y}$ penalize the error between the measured signals and the corresponding values that are calculated by the observer 30, which enables the states of the observer, and specifically the lateral velocity $v_y$, to converge to the physically correct value.

The exemplary adaptive SMO 30 preferably uses kinematic relations for the lateral and longitudinal motion of the vehicle 12 in relative terms, and as mentioned above, includes an adaptive gain definition based on driver steering input and corresponding lateral acceleration for the estimation. An exemplary adaptive SMO 30 estimation is calculated as follows:

$$\dot{\hat{v}}_y = a_y - r v_x + (a_{y_{corr}} + K_{v_y} \tanh(\tilde{a}_y))$$

$$\dot{\hat{v}}_x = a_x - r \hat{v}_x + (K_{v_x} \tanh(v_x - \hat{v}_x))$$

The value of tanh is a hyperbolic tangent that is used to obtain the sign of the error signal without introducing discontinuity.

A compensated acceleration calculator 32 is in communication with the CAN bus 16 and is employed to account for input bias due to roll motion of the vehicle 12. More particularly, because the measured lateral acceleration $a_y$ is typically biased due to vehicle roll motion (as shown in FIG. 6), the estimated lateral states, including the estimated lateral velocity $v_y$, diverge. A compensated lateral acceleration $\hat{a}_y$ is calculated, which is used as a measure of the conditions that yield significant roll motion and result in deviation or bias of the measured lateral acceleration $a_y$ obtained from the vehicle CAN bus 16.

In the compensated acceleration calculator 32:

$$\tilde{a}_y \approx \eta(t) \hat{v}_y$$

Where $\hat{a}_y$ is the compensated lateral acceleration, $\hat{v}_y$ is the estimated lateral velocity from the kinematic model 28, and η(t) is a time-varying gain value that is employed to approximate an expected planar acceleration of the vehicle 12. The compensated acceleration $\hat{a}_y$ is calculated as a nonlinear function of the steering wheel angle as follows:

$$\tilde{a}_y = a_y - \left[ \frac{K_1}{1 + e^{(-K_2 \delta)}} \right] \hat{v}_y$$

The value $K_1$ is a constant gain value used to scale the error level, and is tuned for a given platform of the vehicle 12.

Once the compensated lateral acceleration $â_y$ is determined, a lateral acceleration calculator 34, which is in communication with the CAN bus 16, determines if an error in lateral acceleration $e_y$, also referred to as a lateral acceleration error, is larger than a predefined threshold $T_y$. Specifically, the lateral acceleration calculator 34 defines the error in lateral acceleration $e_y$ as the difference between the measured lateral acceleration $a_y$ obtained from the CAN bus 16 and the compensated lateral acceleration $â_y$:

$$e_y := a_y - â_y > T_y$$

To determine the predefined threshold $T_y$, a road friction condition estimator 36 estimates a road friction μ at a specific time t, which may be expressed as μ(t). The road friction condition estimator 36 is in communication with the CAN bus 16. An exemplary system and method for estimating the road friction μ at time t is shown and described in U.S. Pat. No. 9,751,533, which is owned by the same Assignee as the present invention, The Goodyear Tire & Rubber Company, and is hereby incorporated by reference. Of course, other known systems and methods for estimating the road friction μ may be employed in the road friction condition estimator 36. The road friction condition estimator 36 ensures operation of the system 10 in real time t.

The predefined threshold $T_y$ is then determined in a threshold calculator 38, which is in communication with the CAN bus 16. The threshold calculator 38 calculates an updated threshold value as a function of the real-time road friction μ:

$$T_y = f(μ)$$

The calculation of the updated threshold $T_y$ preferably is performed with a linear regression algorithm, such as:

$$T_y = a_1 μ + a_2$$

The linear regression algorithm employs the road friction μ as an input, and is trained for a given platform of the vehicle 12. The values $a_1$ and $a_2$ are constant coefficients of the regressor, which are computed in the process of training the regressor model using historical data, including data of the lateral acceleration signal on varying road friction μ conditions for the selected vehicle platform.

The updated predefined threshold $T_y$ is input from the threshold calculator 38 into the lateral acceleration calculator 34 to determine, as described above, if the error in lateral acceleration $e_y$ is larger than the predefined threshold.

When the error in lateral acceleration $e_y$ is larger than the predefined threshold $T_y$, the corrected lateral acceleration is modeled as a second order system of the error:

$$\ddot{a}_{y_{corr}} + \tau_1 \dot{a}_{y_{corr}} + \tau_2 = K_f \tilde{a}_y$$

This equation models a filter 40 which is employed to correct the estimated lateral velocity $v_y$. More particularly, the filter 40 is in communication with the CAN bus 16 and is a second-order low pass filter that calculates a filtered value or corrected lateral acceleration $a_{y_{corr}}$:

$$a_{y_{corr}} = G(s)\tilde{a}_y$$

where $$G(s) = \left(\frac{K_f}{s^2 + \tau_1 s + \tau_2}\right)$$

In the filter 40, s is the Laplace operator, and $K_f$, $\tau_1$ and $\tau_2$ are constants for the filter design that are tuned for a given platform of the vehicle 12, in which $K_f$ is static sensitivity, $\tau_1$ is a first order time constant, and $\tau_2$ is a second order time constant.

The filtered value $a_{y_{corr}}$ is fed back into the kinematic model 32. It is used in summation with the observer gain $K_{v_y}$ and integrated into the adaptive SMO 30 to accurately estimate the lateral velocity $v_y$.

When the error in lateral acceleration $e_y$ is smaller than or equal to the predefined threshold $T_y$, the estimated lateral velocity $v_y$ is registered as an accurate lateral velocity in a velocity output register 42. The velocity output register 42 is in communication with the CAN bus 16, and the registered lateral velocity $v_y$ is for the particular time t.

The registered lateral velocity $v_y$ and the measured longitudinal velocity $v_x$ are inputs into a sideslip calculator 44, which is in communication with the CAN bus 16 and calculates a value for the sideslip angle β at the particular time t. The sideslip calculator employs a recursive least squares algorithm to determine the sideslip angle β from the registered lateral velocity $v_y$ and the measured longitudinal velocity $v_x$:

$$β = v_y / v_x$$

The resulting value of the sideslip angle β thus is an accurate value that accounts for road inputs, such as road bank or grade, as well as nonlinearities in the motion of the vehicle 12, such as roll and pitch.

Turning to FIGS. 8A through 8D, test results of a prior art model-based approach are shown, in which sideslip angle β is plotted as a function of time t in vehicle maneuvers. As indicated by the measured values 46 as compared to the estimated values 48, the model-based approach performs reasonably well under consistent conditions, which are the maneuvers shown in FIGS. 8A and 8B. However, as the parameters vary due to a tire change, FIG. 8C, or model nonlinearities, FIG. 8D, the measured values 46 and the estimated values diverge, indicating inaccuracies in the model-based approach.

With reference to FIGS. 9A through 9F, test results of the vehicle sideslip estimation system 10 are shown in which sideslip angle β is plotted as a function of time t in vehicle maneuvers. As indicated in by the measured values 50 as compared to the estimated values 52, the sideslip estimation system 10 performs well when parameters vary due to a tire change, FIGS. 9A through 9D, or model nonlinearities, FIGS. 9E and 9F. Such results show the accuracy of the vehicle sideslip estimation system 10.

Figure 10:
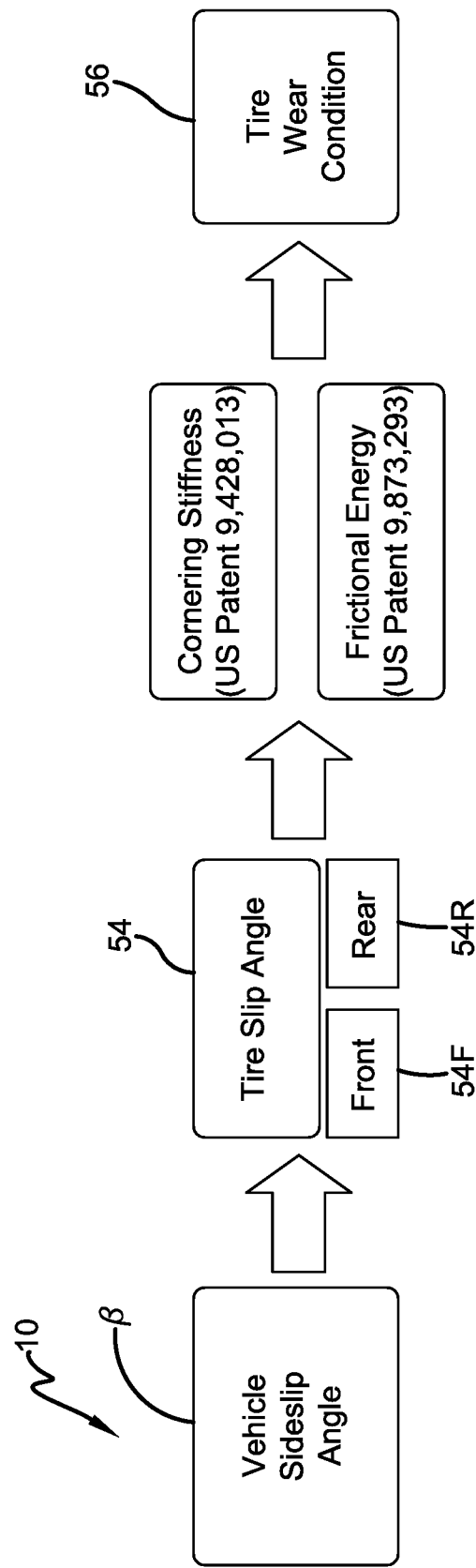
FIG. 10 is a flow chart showing incorporation of the vehicle sideslip estimation system and method of the present invention into a tire wear state estimation system.

Referring to FIG. 10, the accurate sideslip angle β determined by the vehicle sideslip estimation system 10 may be communicated to the vehicle CAN bus 16 to be employed in vehicle control systems, such as stability and handling systems, as well as tire state estimator models that predict tire wear. For example, the sideslip angle β may be used to calculate a tire slip angle 54, including a specific front tire slip angle 54F and a specific rear tire slip angle 54R. These slip angles 54F and 54R may be employed as an input in estimation or prediction systems, such as those shown and described in U.S. Pat. Nos. 9,428,013 and 9,873,293, which are owned by the same Assignee as the present invention, The Goodyear Tire & Rubber Company, and are hereby incorporated by reference. Such estimation or prediction systems may thus employ the sideslip angle β determined by the vehicle sideslip estimation system 10 to generate a robust and reliable tire wear state or condition estimate 56.

In this manner, the vehicle sideslip estimation system 10 accurately and reliably estimates a vehicle sideslip angle β that accounts for road conditions and nonlinearities in vehicle motion, including road bank angle, road friction and the like, as well as a change in tires 14. Road inputs and un-modeled nonlinearities are matched by means of the error between an expected lateral acceleration, which is calculated based on a time-varying gain and the measured lateral acceleration which includes the aforementioned effects. In addition, the vehicle sideslip estimation system 10 is tire agnostic, and thus provides a robust and accurate system even when different tires 14 are mounted on the vehicle 12.

The present invention also includes a method for estimating a sideslip angle β of a vehicle 12. The method includes steps in accordance with the description that is presented above and shown in FIGS. 1 through 10.

It is to be understood that the structure of the above-described vehicle sideslip estimation system 10 and the steps of the accompanying method may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A vehicle sideslip estimation system comprising:
   a vehicle including a controlled area network (CAN) bus system;
   sensors mounted on the vehicle in communication with the CAN bus system;
   a kinematic model in communication with the CAN bus system, the kinematic model receiving signals from the sensors as inputs, wherein the kinematic model estimates a lateral velocity of the vehicle based on the inputs, the inputs including a measured vehicle lateral acceleration and a vehicle longitudinal velocity, the kinematic model being free of a sideslip angle in the estimation of the lateral velocity of the vehicle;
   a compensated acceleration calculator in communication with the CAN bus system to calculate a compensated vehicle lateral acceleration as a measure of vehicle roll and pitch resulting in a deviation of the measured vehicle lateral acceleration;
   a lateral acceleration calculator in communication with the CAN bus system to determine, based on the compensated vehicle lateral acceleration and the measured vehicle lateral acceleration, if a lateral acceleration error is larger than a predefined threshold, wherein the predefined threshold is a function of a real time estimated road friction;
   a filter in communication with the CAN bus system to correct the estimated lateral velocity of the vehicle when the lateral acceleration error is larger than the predefined threshold;
   a velocity output register in communication with the CAN bus system to register the estimated lateral velocity of the vehicle when the lateral acceleration error is smaller than or equal to the predefined threshold; and
   a sideslip calculator in communication with the CAN bus system to calculate a sideslip angle of the vehicle at the estimated road friction time from the registered lateral velocity of the vehicle and the vehicle longitudinal velocity.

2. The vehicle sideslip estimation system of claim 1, wherein the inputs into the kinematic model from the sensors further comprise a steering wheel angle, a yaw rate, and a vehicle longitudinal acceleration.

3. The vehicle sideslip estimation system of claim 2, wherein the kinematic model employs an adaptive sliding mode observer to estimate the lateral velocity of the vehicle.

4. The vehicle sideslip estimation system of claim 3, wherein the lateral velocity is a function of the measured vehicle lateral acceleration, the yaw rate, the vehicle longitudinal velocity, and a lateral velocity gain value.

5. The vehicle sideslip estimation system of claim 4, wherein the longitudinal velocity of the vehicle is updated for observability of the system as a function of the vehicle longitudinal acceleration, the yaw rate, a last estimated lateral velocity, and a longitudinal velocity gain value.

6. The vehicle sideslip estimation system of claim 2, wherein the compensated vehicle lateral acceleration is calculated as a nonlinear function of the steering wheel angle.

7. The vehicle sideslip estimation system of claim 1, wherein the lateral acceleration error is defined as the difference between the measured vehicle lateral acceleration and the compensated vehicle lateral acceleration.

8. The vehicle sideslip estimation system of claim 1, wherein a road friction condition estimator generates the real time estimated road friction, and a threshold calculator updates the predefined threshold as the function of the real time estimated road friction.

9. The vehicle sideslip estimation system of claim 8, wherein the threshold calculator updates the predefined threshold with a linear regression algorithm.

10. The vehicle sideslip estimation system of claim 1, wherein the filter is a second-order low pass filter that calculates a filtered value which is input into the kinematic model.

11. The vehicle sideslip estimation system of claim 1, wherein the sideslip calculator employs a recursive least squares algorithm to calculate the sideslip angle of the vehicle from the registered lateral velocity of the vehicle and the vehicle longitudinal velocity.

12. The vehicle sideslip estimation system of claim 1, further comprising a tire state estimator model that receives the sideslip angle of the vehicle to determine a tire wear state.

13. A method for estimating a vehicle sideslip angle, the method comprising the steps of:
   providing a vehicle that includes a controlled area network (CAN) bus system and sensors mounted on the vehicle in communication with the CAN bus system;
   inputting into a kinematic model, which is in communication with the CAN bus system, signals from the sensors, including a measured vehicle lateral acceleration and a vehicle longitudinal velocity;
   estimating with the kinematic model a lateral velocity of the vehicle based on the inputs, the kinematic model being free of a sideslip angle in the estimation of the lateral velocity of the vehicle;
   calculating with a compensated acceleration calculator, which is in communication with the CAN bus system, a compensated vehicle lateral acceleration as a measure of vehicle roll and pitch resulting in a deviation of the measured vehicle lateral acceleration;
   determining with a lateral acceleration calculator, which is in communication with the CAN bus system, if a lateral acceleration error is larger than a predefined threshold based on the compensated vehicle lateral acceleration and the measured vehicle lateral acceleration, wherein the predefined threshold is a function of a real time estimated road friction;

correcting with a filter, which is in communication with the CAN bus system, the estimated lateral velocity of the vehicle when the lateral acceleration error is larger than the predefined threshold;

registering with a velocity output register, which is in communication with the CAN bus system, the estimated lateral velocity of the vehicle when the lateral acceleration error is smaller than or equal to the predefined threshold; and calculating with a sideslip calculator, which is in communication with the CAN bus system, a sideslip angle of the vehicle at the estimated road friction time from the registered lateral velocity of the vehicle and the vehicle longitudinal velocity.

14. The method for estimating a vehicle sideslip angle of claim 13, wherein the step of inputting signals from the sensors into the kinematic model includes inputting a steering wheel angle, a yaw rate, and a vehicle longitudinal acceleration.

15. The method for estimating a vehicle sideslip angle of claim 14, wherein the step of estimating the lateral velocity of the vehicle with the kinematic model includes employing an adaptive sliding mode observer to estimate the lateral velocity of the vehicle.

16. The method for estimating a vehicle sideslip angle of claim 14, wherein the step of calculating the compensated vehicle lateral acceleration with the compensated acceleration calculator includes calculating the compensated vehicle lateral acceleration as a nonlinear function of the steering wheel angle.

17. The method for estimating a vehicle sideslip angle of claim 13, wherein the step of determining if the lateral acceleration error is larger than the predefined threshold with the lateral acceleration calculator further comprises estimating the real time estimated road friction with a road friction condition estimator, and updating the predefined threshold as the function of the real time estimated road friction with a threshold calculator.

18. The method for estimating a vehicle sideslip angle of claim 17, wherein the step of updating the predefined threshold as a function of the real time road friction with a threshold calculator includes the use of a linear regression algorithm.

19. The method for estimating a vehicle sideslip angle of claim 18, wherein the step of correcting the estimated lateral velocity of the vehicle with a filter includes the use of a second-order low pass filter, and inputting a calculated filtered value into the kinematic model.

20. The method for estimating a vehicle sideslip angle of claim 13, wherein the step of calculating a sideslip angle of the vehicle with a sideslip calculator includes using a recursive least squares algorithm in the sideslip calculator.

* * * * *